(No Model.)

A. H. GELTZ.
CAR FENDER.

No. 590,975.　　　　　　　　　Patented Oct. 5, 1897.

Witnesses:—
A. V. Appleman Jr
Frank H. Stright

Inventor:
A. H. Geltz.
By Henry C. Evert, Att'y

UNITED STATES PATENT OFFICE.

ALBERT H. GELTZ, OF ALLIANCE, OHIO.

CAR-FENDER.

SPECIFICATION forming part of Letters Patent No. 590,975, dated October 5, 1897.

Application filed August 10, 1896. Serial No. 602,281. (No model.)

*To all whom it may concern:*

Be it known that I, ALBERT H. GELTZ, a citizen of the United States of America, residing at Alliance, in the county of Stark and State of Ohio, have invented certain new and useful Improvements in Car-Fenders, of which the following is a specification, reference being had therein to the accompanying drawings.

This invention relates to certain new and useful improvements in car-fenders, and has for its principal object to construct a car-fender that will effectually prevent an object passing under the same and thus come in contact with the wheels of the car.

A further object of the invention is to construct a fender that will accomplish the above result and that will at the same time be extremely simple in its construction, strong, durable, effectual in its operation, and comparatively inexpensive to manufacture; furthermore, that it may be conveniently folded to prevent the same occupying any room in the car-barns.

With the above and other objects in view the invention finally consists in the novel construction, combination, and arrangement of parts to be hereinafter more specifically described, and particularly pointed out in the claim.

In describing the invention in detail reference is had to the accompanying drawings, forming a part of this specification, and wherein like letters of reference indicate similar parts throughout the several views, in which—

Figure 1:
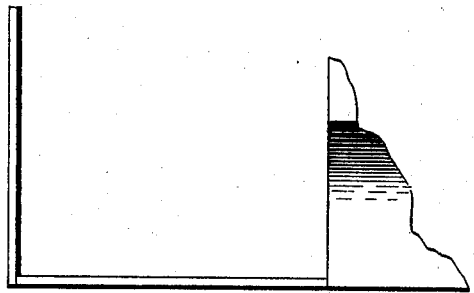
Figure 1:
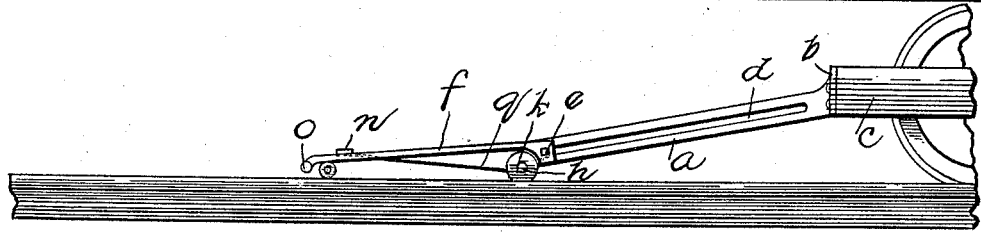
Figure 2:
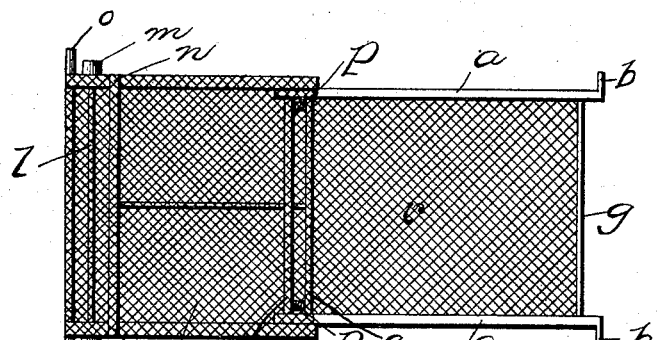
Figure 3:
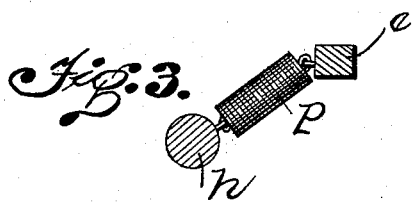

Figure 1 is a side view of the fender, showing same in position on the car. Fig. 2 is a top plan view of the fender. Fig. 3 is a plan view of the retracting-spring, showing the cross-bars in section.

In the drawings, $a$ represents the side braces, provided at their inner ends with flanges $b\ b$ for attaching to the truck $c$. These side braces are provided with slots $d$, extending in alinement with the brace, said slots being adapted to receive the cross-bar $e$, which connects the side rails $f$ of the front fender together and slides in said slots. The side braces $a\ a$ are connected at the rear by a cross-brace $g$ and at the front are supported by an axle $h$, carrying on its ends wheels or rollers $k\ k$, adapted to engage on the rails. The side rails $f$ are also supported at the front by an axle $l$, carrying on its end rollers $m\ m$, adapted to ride on the top of the rail. The side rails $f\ f$ are also braced by a cross-bar $n$ and at the front by a cross-rod $o$, which may be made rigid or to revolve, as may be desired. Coil-springs $p\ p$ are attached to the axle $h$ and cross-pieces $e$, thus holding the front fender normally at the extreme end of the slots $d\ d$, and a spring $g$, attached to the cross-bar $n$, passing under the axle $h$ and secured to the cross-bar $e$, serves to hold the front part of the fender in close proximity to the track, either when in its normal position or when being retracted by coming in contact with an object.

Both the front and rear portions of the fender are covered with a suitable netting $r$ to receive the object when it is carried up on the fender.

The operation of my improved car-fender will be readily apparent from the views of same that I have shown in the drawings, but in order to illustrate the same more clearly to those unskilled in the art we will assume that the parts have all been secured in their respective positions, as shown in the drawings, that the fender is in position on the car, and it comes in contact with an object on the track. As the front of the fender will be forced backward on the rear fender and during its passage backward the front will be held normally in close proximity to the track by reason of the spring $q$, when the front fender has reached its path of travel, the object by reason of the firm resistance offered by the rigid rear fender will be lifted up on top of the fender and out of the way of danger. When the weight on the fender has been relieved, the coil-springs attached to the cross-bar $p$ will retract the front fender to its normal position once more.

It will be observed that the wheels $k\ k$ are adapted to ride in the groove in the rails, while the rollers $m\ m$ ride on the top of the rails, thus permitting the fender to pass easily around any curve, no matter how abrupt the same may be.

I desire to call particular attention to the fact that by this construction of a fender it will be impossible for any object to pass in under the fender and come in contact with the wheels, as the rear portion being rigid prevents the fender from rising when it comes in contact with the object.

It will also be noted that various changes may be made in the details of construction without departing from the general spirit of my invention.

Having fully described my invention, what I claim as new, and desire to secure by Letters Patent, is—

The rear portion of the fender, provided with slotted side braces which are rigidly secured at their inner ends to the truck of the car, and connected at their ends by the cross-pieces $g$ $h$ and the front wheels $k$, which run in the groove of the rails, combined with the movable front portion of the fender, supported at its rear end by the rear portion of the fender and at its front end by the wheels $m$ which run upon the tops of the rails, and which front portion is composed of the two side pieces $f f$, connected at their rear ends by the cross-piece $e$ which extends through the slots $d$ and serve as a guide; and at its front end by suitable connecting-pieces; and the springs $p$ which connect the two cross-pieces $h$ and $e$, and return the front portion of the fender to position after having been forced backward, substantially as shown and described.

In testimony whereof I affix my signature in presence of two witnesses.

ALBERT H. GELTZ.

Witnesses:
A. M. WILSON,
H. E. SEIBERT.